(12) United States Patent
Enbom et al.

(10) Patent No.: US 8,818,799 B2
(45) Date of Patent: Aug. 26, 2014

(54) METHOD OF INDICATING PRESENCE OF TRANSIENT NOISE IN A CALL AND APPARATUS THEREOF

(75) Inventors: Niklas Enbom, Stockholm (SE); Roar Hagen, Stockholm (SE); Jan Skoglund, San Francisco, CA (US)

(73) Assignee: Google Inc., Mountain View, CA (US)

( * ) Notice: Subject to any disclaimer, the term of this patent is extended or adjusted under 35 U.S.C. 154(b) by 147 days.

(21) Appl. No.: 13/179,239

(22) Filed: Jul. 8, 2011

(65) Prior Publication Data

US 2012/0014514 A1 Jan. 19, 2012

Related U.S. Application Data

(60) Provisional application No. 61/363,487, filed on Jul. 12, 2010.

(30) Foreign Application Priority Data

Jul. 9, 2010 (EP) .................................... 10169088

(51) Int. Cl.
 *G10L 21/02* (2013.01)
(52) U.S. Cl.
 USPC .......................................... 704/226; 370/352
(58) Field of Classification Search
 USPC ........................................ 704/226; 379/32.01
 See application file for complete search history.

(56) References Cited

U.S. PATENT DOCUMENTS

| | | | |
|---|---|---|---|
| 5,894,513 A | 4/1999 | Nasu | |
| 6,917,587 B1 | 7/2005 | Sarkar et al. | |
| 2003/0091182 A1 | 5/2003 | Marchok et al. | |
| 2005/0002400 A1 | 1/2005 | Karol et al. | |
| 2005/0114128 A1 | 5/2005 | Hetherington et al. | |
| 2006/0018459 A1 | 1/2006 | McCree | |
| 2006/0116873 A1* | 6/2006 | Hetherington et al. | ....... 704/226 |
| 2006/0217973 A1 | 9/2006 | Gao et al. | |
| 2007/0286347 A1 | 12/2007 | Moore | |
| 2009/0010456 A1 | 1/2009 | Goldstein et al. | |
| 2010/0062719 A1 | 3/2010 | Diethorne | |

(Continued)

FOREIGN PATENT DOCUMENTS

| | | |
|---|---|---|
| EP | 1 626 591 A1 | 2/2006 |
| JP | 8-293820 A | 11/1996 |

(Continued)

OTHER PUBLICATIONS

International Search Report issued in related application No. PCT/US2011/043379, dated Nov. 2, 2011.

(Continued)

*Primary Examiner* — Creighton Smith
(74) *Attorney, Agent, or Firm* — Birch, Stewart, Kolasch & Birch, LLP

(57) ABSTRACT

A method and an apparatus for indicating presence of a transient noise in a call are provided. The method comprises the steps of determining activity at an endpoint of the call by monitoring presence of a signal input from the endpoint into the call and monitoring presence of a potential source of transient noise at the endpoint. Further, based on the activity determination and the monitoring of the presence of a potential source of transient noise, a signal representative of the presence of a transient noise in the call is sent. The present invention is advantageous in that it enables improvement of the quality of the call.

24 Claims, 4 Drawing Sheets

(56) References Cited

U.S. PATENT DOCUMENTS

| | | | |
|---|---|---|---|
| 2011/0243123 A1* | 10/2011 | Munoz-Bustamante et al. | 370/352 |
| 2012/0014269 A1* | 1/2012 | Ray et al. | 370/252 |
| 2012/0229170 A1* | 9/2012 | Scholder | 327/79 |

FOREIGN PATENT DOCUMENTS

| | | | |
|---|---|---|---|
| JP | 2006-163417 A | 6/2006 | |
| JP | 2009-92994 A | 4/2009 | |
| JP | 2010-34630 A | 2/2010 | |

OTHER PUBLICATIONS

International Written Opinion issued in related application No. PCT/US2011/043379, dated Nov. 2, 2011.

European Search Report dated Oct. 9, 2012 for Application No. 12184929.3.

* cited by examiner

METHOD OF INDICATING PRESENCE OF TRANSIENT NOISE IN A CALL AND APPARATUS THEREOF

This nonprovisional application claims the benefit of U.S. Provisional Application No. 61/363,487 filed on Jul. 12, 2010 and to EP Patent Application No. 10169088.1 filed in European Patent Office, on Jul. 9, 2010. The entire contents of all of the above applications is hereby incorporated by reference.

FIELD OF THE INVENTION

The present invention relates to a method of indicating presence of a transient noise in a call and an apparatus designed to operate according to such a method.

BACKGROUND OF THE INVENTION

During a call, such as an audio or video conference, involving several participants, some of the participants (typically a participant currently inactive in the conference but not necessarily) may for example wish to write an e-mail or take notes on a computer by, e.g., typing on a keyboard or clicking with a mouse. However, such typing or clicking activities may generate a clicking type sound or noise, also referred to as transient noise in the following, which may easily be picked up by the microphone used by the participant in the call since the microphone typically is located close to the keyboard. Thus, such a transient noise may be fed into the call or conference and heard by all participants, thereby disturbing the conference and greatly reducing the end user experience and effectiveness of the conference.

Such a problem may occur both if the transient noise is generated by the participant himself/herself, e.g. by typing on his/her own keyboard, and if the transient noise is generated in proximity to or near the microphone of the participant, for example by keyboard typing on a neighboring computer.

Thus, there is a need for providing new methods and apparatuses that would enable to overcome, or at least alleviate or mitigate, at least some of the above mentioned drawbacks.

SUMMARY OF THE INVENTION

It is with respect to the above considerations that the present invention has been made. An object of the present invention is to provide a method and an apparatus for indicating presence of a transient noise in a call, thereby enabling improvement of the quality of the call.

This and other objects of the present invention are achieved by means of a method and an apparatus having the features defined in the independent claims. Preferable embodiments of the invention are characterized by the dependent claims.

Hence, according to a first aspect of the present invention, a method of indicating presence of a transient noise in a call is provided. The method comprises the steps of determining activity at an endpoint of the call by monitoring presence of a signal input from the endpoint into the call and monitoring presence of a potential source of transient noise at the endpoint. Further, based on the activity determination and the monitoring of the presence of a potential source of transient noise, a signal representative of the presence of a transient noise in the call is sent.

Further, according to a second aspect of the present invention, an apparatus for indicating presence of a transient noise in a call is provided. The apparatus comprises an activity monitoring unit, a detecting unit and a transmitting unit. The activity monitoring unit is configured to determine activity at an endpoint by monitoring presence of a signal input from the endpoint into the call and the detecting unit is configured to monitor presence of a potential source of transient noise at the endpoint. Based on the activity determination (by the activity monitoring unit) and the monitoring of the presence of a potential source of transient noise (by the detecting unit), the transmitting unit is configured to send a signal representative of the presence of a transient noise in the call.

The present invention is based on the idea of combining the determination of an activity into a call at an endpoint with the monitoring of the presence of a potential source of transient noise at the endpoint. Based on these two indicators, a signal representative of the presence of transient noise can be sent. Such a signal may therefore indicate whether there in fact is a transient noise generated at the endpoint.

With the term "potential source of transient noise" it is meant a source potentially contributing to the input signal with a transient noise. Examples of potential sources of transient noise may be keyboard typing or mouse clicking.

For example, with the present invention, if activity is detected at the endpoint without detection of presence of a potential source of transient noise, the activity is most probably originated by a participant actively involved in the call and providing speech data as an input signal. Further, if presence of a potential source of transient noise is detected without detection of activity at the endpoint, then the potential source of transient noise is not sufficient to generate a significant signal input, i.e. a transient noise, in the call (thereby not disturbing the call). In these two scenarios, the signal may then indicate that there is no, or at least very little, presence of transient noise. On the other hand, if it is both detected that there is activity at the endpoint and presence of a potential source of transient noise at the endpoint, the signal may indicate that there is most likely presence of a transient noise in the call, with the risk of creating a disturbance.

As compared to prior art techniques wherein a systematic (or continuous) suppression of noise by e.g. signal treatment is performed, the present invention is advantageous in that it indicates whether there is presence of a transient noise via a signal representative of the presence of such a transient noise in the call, thereby reducing unnecessary use of computer resources for signal treatment.

Further, the present invention is advantageous in that it may provide information on the presence of a transient noise in an on-going call or conference. Depending on the information carried by the signal, it may be decided whether any action is to be taken during the call.

The present invention is also advantageous in that it does not require a systematic suppression of sounds created by the keystrokes, which sounds might be desirable by the participant typing on his/her keyboard, in case it is determined that the presence of the potential source of noise (in this example the typing on a keyboard) does not generate a significant signal input in the call.

The present invention is also advantageous in that it may indicate presence of a potential source of transient noise at an endpoint both if the participant is, or is not, actively involved in the call (i.e. providing, or not, speech data as an input signal).

The present invention is also advantageous in that it provides an efficient detection of the presence of a transient noise in the call since it is based on the combination of two indicators and not (only) on a direct detection of a transient noise.

The present invention is also advantageous in that it enables improvement of the end user experience and effectiveness of the conference.

In the following, embodiments of the present invention are first described with reference to the method of the present invention described above. However, it will be appreciated that these embodiments may equally be combined with the apparatus of the present invention described above as well.

According to an embodiment, the signal may comprise a degree of confidence indicating the probability of the presence of a transient noise, which is advantageous in that it further characterizes the determination of the presence of a transient noise. Such a degree of confidence increases the possibility of deciding whether the transient noise is disturbing the call or not.

According to an embodiment, the method of the present invention may further comprise a step of buffering, for a period of time, the determinations associated with the step of determining activity at the endpoint or the determinations associated with the step of monitoring presence of a potential source of transient noise at the endpoint. The method may then advantageously comprise the calculation of a state value according to the following conditions. A first predetermined value may be added to the state value if a potential source of transient noise is detected within the buffering period of time and an inactive to active transition has been detected in the activity within the buffering period of time. In this case, some transient noise is most probably entering the call and the state value is therefore increased.

Further, a second predetermined value may be subtracted from the state value if a potential source of transient noise is detected within the buffering period of time without detection of an inactive to active transition in the activity in the buffering period of time. In this case, a potential source of transient noise (e.g. keyboard typing) is detected but there is no contribution of the potential source of transient noise to the input signal. Thus, the potential source of transient noise is not disturbing and the state value is decreased.

Further, a third predetermined value may be subtracted from the state value if an inactive to active transition is detected in the activity within the buffering period of time without detection of a potential source of transient noise within the buffering period of time. In this case, the detection of activity is not originated from a potential source of transient noise and the state value is thereby decreased. Optionally, a fourth predetermined value may also be subtracted from the state value if no inactive to active transition is detected in the activity within the buffering period of time and no potential source of transient noise is detected within the buffering period of time.

The embodiment described above with respect to the calculation of a state value is advantageous in that the signal may comprise information about the state value and thereby provide a further indication on whether there is presence of a potential source of transient noise. Thus, if the state value increases, it indicates that transient noise is present at an endpoint and thereby that a potentially disturbing situation is occurring.

Optionally, the state value according to the above may be used for determining the degree of confidence mentioned in the embodiment described above. In particular, the degree of confidence may increase if the state value increases and vice versa.

According to an embodiment, the step of determining activity at the endpoint may be performed on the basis of a first time interval. This time interval may preferably be shorter than the buffering period of time, which is advantageous in that it allows the buffering period of time to comprise at least one, but preferably several, determination of activity, thereby enhancing the accuracy in the determination of the presence of a transient noise.

According to an embodiment, the step of monitoring presence of a potential source of transient noise may comprise the step of analyzing a signal input detected during the step of determining activity at the endpoint. The present embodiment is advantageous in that it enables monitoring of a potential source of a transient noise coming either from an endpoint being part of the call, e.g. a keyboard used at the participant's computer, or from another device or apparatus located in proximity to the endpoint, for example a neighboring computer.

According to another embodiment or in combination with the last described embodiment, the step of monitoring presence of a potential source of transient noise may comprise the step of receiving information that a potential source of transient noise has been activated at the endpoint. For example, the computer or device used by the participant may be configured to provide such information (e.g. that a key of the keyboard has been pressed). The present embodiment is advantageous in that the monitoring of the presence of a potential source of transient noise is more accurate, thereby reducing the risk of erroneous detection of noise coming from, for example, speech data analysis.

Still in connection with the two lastly described embodiments and referring now in particular to the apparatus of the present invention as described above, the detecting unit may be configured to analyze a signal input detected by the activity monitoring unit for determining presence of a potential source of transient noise in the input signal. As an alternative or complement, the detecting unit may be configured to receive information that a potential source of transient noise has been activated.

The above mentioned step of receiving information may be performed on the basis of a second time interval being shorter than the buffering period of time. The second time interval may be shorter, longer or the same as the first time interval.

According to an embodiment, the signal may be a warning signal, which indicates presence of a disturbing transient noise if presence of a potential source of transient noise is detected and if an inactive to active transition is monitored in the activity. The warning signal may in an alternative embodiment indicate presence of a disturbing transient noise if the above mentioned state value exceeds a predetermined threshold.

According to an embodiment, the method of the present invention may advantageously comprise either a step of reducing the input signal from the endpoint or muting a microphone associated with the endpoint. The signal may then preferably include information that the input signal is reduced or that the microphone is muted. In particular, the signal may preferably be a warning signal. This embodiment is advantageous in that, if the signal indicates presence of a transient noise, it is an efficient and relatively simple way to hinder the transient noise to enter the call and thus prevent a disturbing situation to occur.

According to an embodiment, the method may further comprise the step of identifying a segment of input signal comprising a disturbing transient noise (i.e. for which presence of transient noise has been detected). The identified segment may then be replaced with a silent segment or a comfort noise segment. As an alternative, it may be replaced with a segment generated on the basis of long term statistics of the input signal. Another alternative may also be to replace the identified segment with a segment generated by interpolation of features of adjacent segments of the input signal.

According to yet another alternative, the identified segment may be treated for noise reduction or noise suppression.

Referring now in particular to the apparatus of the present invention as described above, further embodiments are described in the following.

The apparatus may comprise a timer configured to synchronize the operation of the activity monitoring unit and the detecting unit such that the determinations of the activity monitoring unit and the detecting unit are comprised within a predetermined time window.

In an embodiment, the apparatus may comprise a processor. The processor may then be configured to add a first predetermined value to a state value if a potential source of transient noise is detected by the detecting unit within the time window and an inactive to active transition has been detected by the activity monitoring unit within the time window. Further, the processor may also be configured to subtract a second predetermined value from the state value if a potential source of transient noise is detected by the detecting unit within the time window without detection of an inactive to active transition by the activity monitoring unit within the time window. Further, the processor may also be configured to subtract a third predetermined value from the state value if an inactive to active transition is detected by the activity monitoring unit within the time window without detection of a potential source of transient noise by the detecting unit within the time window. Further, the processor may also be configured to subtract a fourth predetermined value from the state value if no inactive to active transition is detected by the activity monitoring unit within the time window and no potential source of transient noise is detected by the detecting unit within the time window. In this embodiment, the apparatus may be configured to send a signal comprising information about the state value.

Effects and features of the apparatus according to the second aspect of the present invention and its embodiments are largely analogous to those described above in connection with the method according to the first aspect of the present invention. It will be appreciated that different features in embodiments described with reference to the method according to the first aspect of the invention can be combined with the apparatus according to the second aspect of the invention and, vice versa, to create embodiments other than those described herein.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
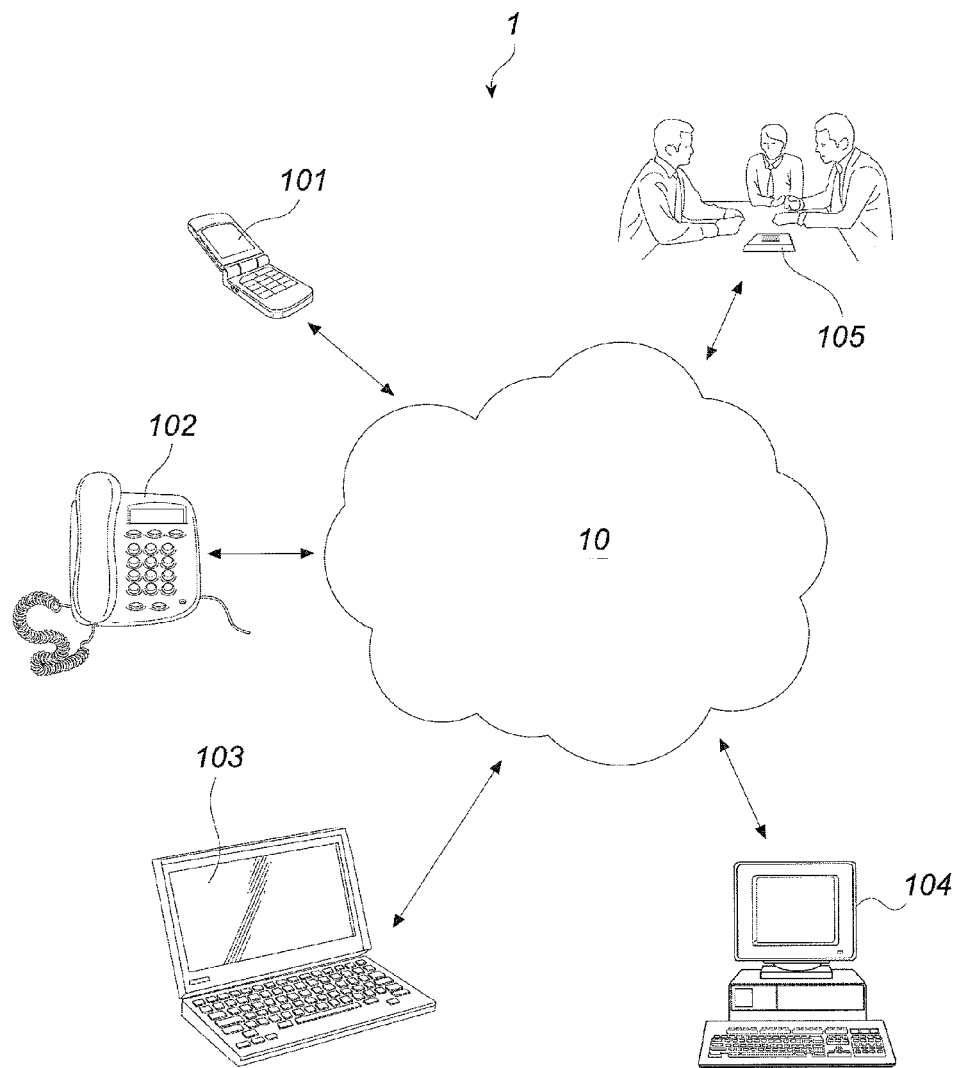
FIG. 1 schematically shows a video/audio conference call.

An audio/video conferencing system 1 is shown in FIG. 1. A variety of devices may participate in the conference through a conference bridge 10. As shown in FIG. 1, the devices may for example be a mobile phone 101, a phone 102, a laptop computer 103, a desktop computer 104 and a conference phone 105. During the conference call, some of the participants may choose to write an e-mail or take notes on a computer. Such typing activities may generate a transient noise. The term "transient noise" is herein referred to as a sound or sound wave with a short, pulse-like signal characteristic. Potential sources of transient noise may for example be clicking noise from a computer mouse or keyboard typing noise from a computer keyboard or a phone keypad.

As an example, if two participants, each at a respective endpoint in a call are situated in proximity of each other in an open-plan office, one of the participants using a phone 102 and the other using a laptop computer 103, potential transient noise may be generated at both endpoints in the call if the participant using the laptop computer 103 starts typing.

Figure 2:
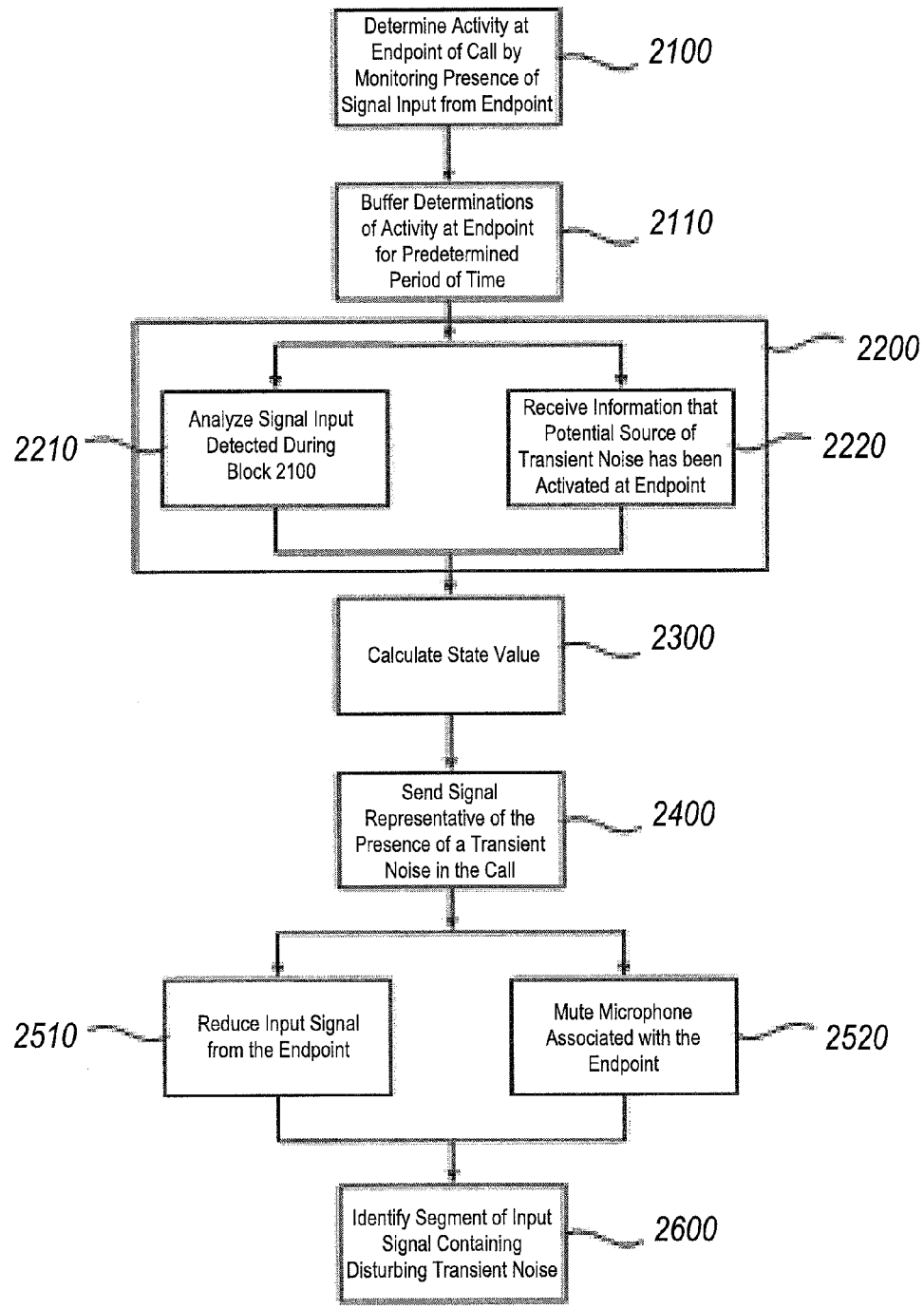
FIG. 2 shows a schematic view of a method according to an embodiment of the invention.

Referring now to FIG. 2, a method 2000 according to an embodiment of the invention will be described.

The method 2000 comprises a step 2100 of determining activity at an endpoint of the call by monitoring presence of a signal input from the endpoint into the call. As an example, the determining of activity may be obtained on the basis of Voice Activity Detection, VAD. VAD is a technique in which presence or absence of sound such as human speech may be detected and is typically used in Voice over Internet Protocol (VoIP) technology to avoid sending packets of data when a speaker is silent. However, a typical VAD cannot differentiate a signal input comprising speech data from an input signal comprising transient noise. Thus, if a positive decision is issued by the VAD it means that a signal input is monitored at the endpoint. In other words, it means that activity is detected at the endpoint, either because the endpoint's user is talking or because another source of sound is activated, such as keyboard typing.

In an embodiment, the method 2000 may further comprise a step 2110, wherein the determinations associated with the step 2100 of determining the activity at the endpoint or the determinations associated with the step 2200 of monitoring presence of a potential source of transient noise at the endpoint may be buffered for a predetermined period of time, e.g. 100 milliseconds (ms). Thus, for a point of time at which presence of a potential source of transient noise is monitored, the VAD decisions may be stored in a buffering period of time of 100 ms counted backwards from the point of time.

In an alternative embodiment, for a point of time at which a VAD decision is taken, the determinations associated with the monitoring of presence of a potential source of transient noise are stored in a buffering period of time of 100 ms counted backwards from the point of time. Preferably, the determinations associated with determination of the activity may be buffered, since the determinations associated with the monitoring of presence of a potential source of transient noise typically arrives about 50 ms after the determining of activity due to a delay before obtaining a notification from the operating system about an input event, e.g. keyboard typing from a keyboard.

Furthermore, the step of determining the activity may be performed on the basis of a first time interval which advantageously may be shorter than the buffering period of time, e.g. 20 ms. The first time interval may as well be longer or shorter, e.g. 10 ms. Thus, according to an exemplifying embodiment, the VAD decisions may be provided on a block basis of 20 ms, and a set of VAD decisions may be stored during a buffering period of time of 100 ms backwards in time. The stream of VAD decisions may be monitored and a filtered version of these decisions, i.e. the decisions comprised within a time window, will be used for activity detection.

The method 2000 further comprises a step 2200 of monitoring presence of a potential source of transient noise at the endpoint. According to an embodiment of the invention, this step 2200 may comprise a step 2210 of analyzing a signal input detected during the step 2100 of determining activity at the endpoint. As an example, the input signal may be analyzed by an algorithm and potential transient noise, for example keyboard typing noise, can be detected in the input signal. To detect potential transient noise in an input signal, several different methods may be used. In such methods, a transient click or onset may be identified when a certain detection function exceeds a threshold. The detection function may be based on a specific signal model, such as an auto-regressive (AR) model of a time-domain signal, or other probabilistic signal models. The detection function may then be derived from a measure of the deviation between the actual input signal and a signal obtained via a statistical model. As another example, a particular method may be to utilize AR modeling of the Short-Term Fourier Transform (STFT) magnitudes of the input (audio) signal and flag for detection when a prediction error exceeds a threshold.

Alternately, non-model based detection functions may also be used. In such methods, the detection function may be based on specific suitable signal features, such as spectral differences in the STFT or wavelet domains.

According to another embodiment or in combination with the embodiment associated with the step 2210 of analyzing a signal input such as described above, the step 2200 of monitoring presence of a potential source of transient noise at the endpoint may comprise a step 2220 of receiving information that a potential source of transient noise has been activated at the endpoint. The computer or device such as any of the devices described with reference to FIG. 1 used at the endpoint by the participant may be configured to provide such information. For example, an Application Programming Interface, API, provided by an operating system on the computer may be utilized. API is an interface used by a software program for enabling the software program to interact with another software program. Thus, the detecting unit of the apparatus implementing the method of the present invention may, via the API, receive information if a key of a keyboard of the device used at the endpoint by a participant has been pressed.

In an embodiment of the invention, the receiving of information may be performed on the basis of a second time interval being shorter than the buffering period of time, for example 10 ms.

Moreover, based on the activity determination 2100 and the monitoring 2200 of the presence of a potential source of transient noise, a step 2400 of sending a signal representative of the presence of a transient noise in the call is provided.

Figure 3:
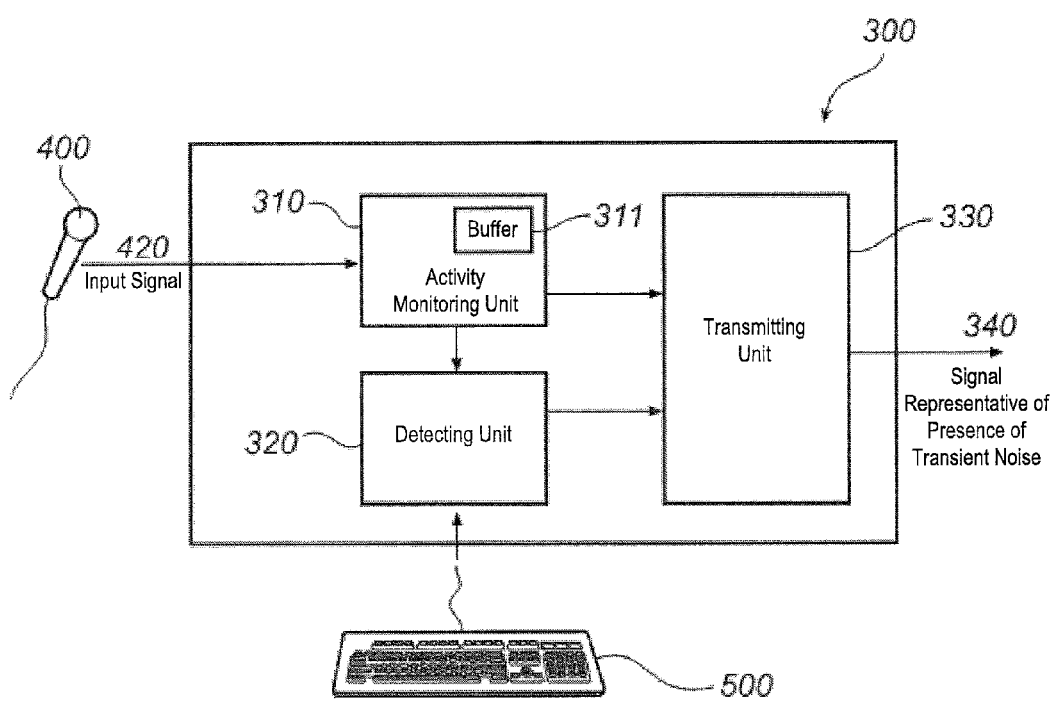
FIG. 3 shows a schematic view of an apparatus according to an embodiment of the invention.

Referring now to FIG. 3, an apparatus 300 according to an embodiment of the present invention will be described. The apparatus 300 comprises an activity monitoring unit 310, a detecting unit 320 and a transmitting unit 330.

The activity monitoring unit 310 is configured to determine activity at an endpoint, represented by a microphone 400 and a keyboard 500 as an example in FIG. 3, by monitoring presence of a signal input from the endpoint into the call. The activity monitoring unit 310 is operatively connected to the microphone 400 for detecting an input signal 420 (e.g. sound or a sound wave). The detecting unit 320 is configured to monitor presence of a potential source of transient noise at the endpoint. Based on the activity determination obtained by the activity monitoring unit 310 and the monitoring of the presence of a potential source of transient noise obtained by the detecting unit 320, the transmitting unit 330 is configured to send a signal 340 representative of the presence of a transient noise in the call.

In an embodiment of the invention, the apparatus 300 may further comprise a processor configured to process the activity determination obtained by the activity monitoring unit 310 and the monitoring of the presence of a potential source of transient noise obtained by the detecting unit 320 in order to provide the transmitting unit 330 with information representative of the presence of a transient noise in the call. The processor may be arranged in the transmitting unit 330, the activity monitoring unit 310, the detecting unit 320, or as a separate unit.

In an embodiment, the apparatus 300 may further comprise a timer configured to synchronize the operation of the activity monitoring unit 310 and the detecting unit 320 such that the determinations of the activity monitoring unit 310 and the detecting unit 320 are comprised within a predetermined time window. The timer may be arranged in the processor, as a separate unit or in any of the other units in the apparatus 300.

In an embodiment, the activity monitoring unit 310 may further comprise a buffer 311 or memory for storing the decisions associated with the step 2100 of determining the activity at the endpoint. The buffer 311 is preferably arranged in the activity monitoring unit 310.

According to an embodiment, the signal 340 may comprise a degree of confidence indicating the probability of the presence of a transient noise. The degree of confidence may be a digital value, such as an integer comprised between 0 and 10, representing the level of confidence in the determination of the presence of a transient noise. Alternatively, the degree of confidence may be a string or text such as "strong", "medium" and "weak". For example, if the degree of confidence is strong and the signal indicates that there is presence of a transient noise, there is a strong indication that a transient noise is indeed present, most probably disturbing the call. If the degree of confidence was weak, the transient noise would probably be just a small disturbance (in e.g. amplitude or duration) which probably does not affect the call.

Now turning back to the method 2000 described with reference to FIG. 2, the method 2000 may further comprise a step 2300 of calculating a state value. As an example, the state value may be calculated according to the following conditions.

Initially, the state value may be equal to 1 or 0. Then, a first predetermined value, for example 100, may be added to the state value if a potential source of transient noise is detected at a point of time and an inactive to active transition has been detected in the activity during the buffering period of time counted backwards from the point of time. Further, a second predetermined value, for example 1, may be subtracted from the state value if a potential source of transient noise is detected at a point of time without detection of an inactive to active transition in the activity in the buffering period of time, i.e. if the detected potential source of transient noise (for example that a key has been pressed or a mouse has been used) does not contribute to any input signal. Further, a third predetermined value may be subtracted from the state value if a potential source of transient noise is not detected at the point of time. The signal 340 sent based on the activity determination and the monitoring of the presence of a potential source of transient noise may comprise information about the state value. Although the first predetermined value is set to 100 and the second and third predetermined value are set to 1 in the above example, it is envisaged that other values may be used. However, it is advantageous that the first redetermined value is greater that the second and third predetermined values since the state value may increase relatively fast when a transient noise enters the call and slowly decrease when no transient noise enters the call.

Preferably, the processor earlier mentioned in relation to FIG. 3 may also be configured to carry out the step 3300 of calculating the state value.

In an embodiment of the invention, the signal 340 may be a warning signal indicating presence of a disturbing transient noise if presence of a potential source of transient noise is detected (at step 2200) and if an inactive to active transition is monitored (at step 2100). In particular, the warning signal may indicate presence of a disturbing transient noise if the above mentioned state value exceeds a threshold, e.g. 300.

Figure 4:
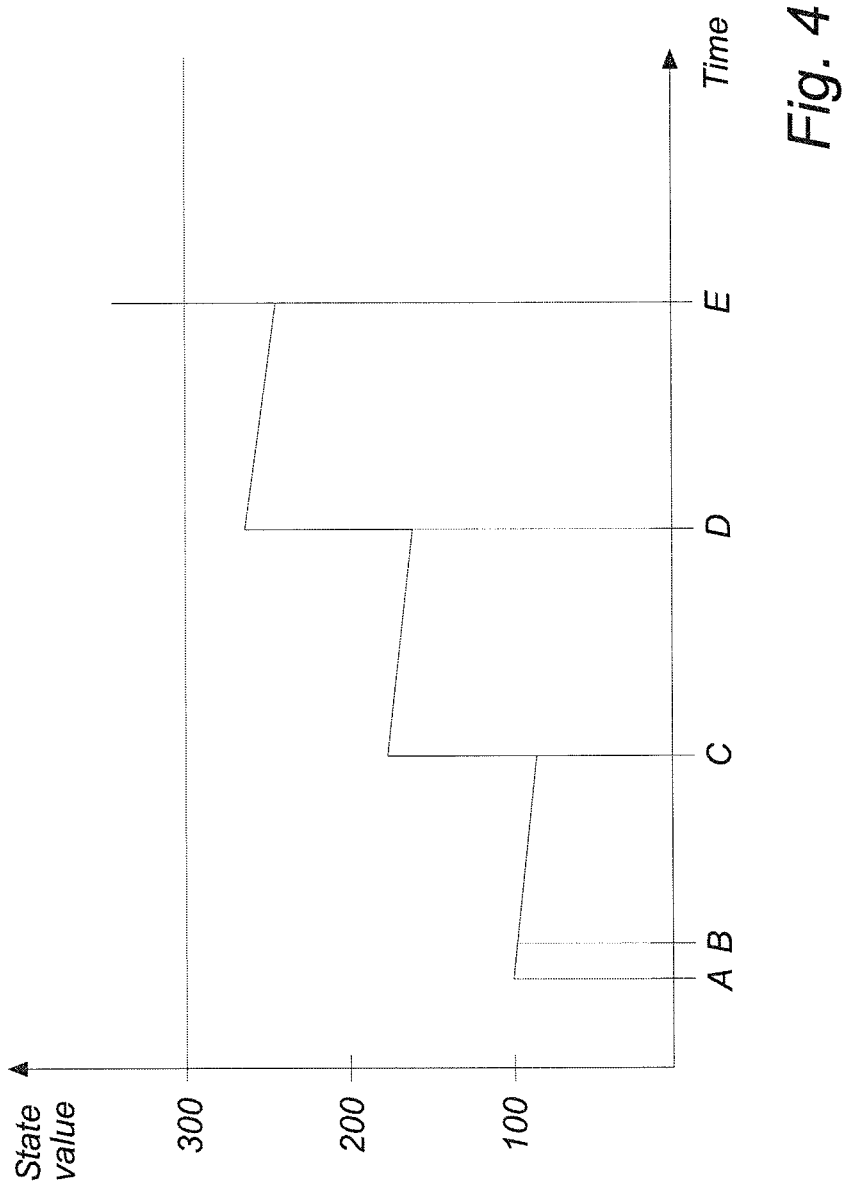
FIG. 4 shows a diagram showing the implementation of the calculation of a state value in accordance with an embodiment of the invention.

FIG. 4 shows a diagram showing the implementation of the calculation of a state value in accordance with the above described embodiment. As an example, the step 2300 of calculating the state value is performed every 10 ms and before a point of time A, the state value is set to 0. By the point of time A, a potential source of transient noise is detected at the endpoint and an inactive to active transition has been detected in the activity during the buffering period of time counted backwards from the point of time A. Thus, there is an indication that a transient noise has entered the call and 100 will be added to the state value. At a point of time B (e.g. 10 ms after the point of time A), the step 2300 of calculating the state value is performed again. This time, no potential source of transient noise is detected and, thus, 1 is subtracted from the state value. The subtracting will be repeated every 10 ms until a point of time C, when a strong indication that transient noise is again detected, and accordingly 100 is added to the state value. In the same way, 100 will be added to the state value at the points of time D and E. At the point of time E, the state value exceeds the threshold (300) and hence a warning signal indicating presence of a disturbing transient noise is sent.

According to the exemplifying embodiment described above, the state value may climb up to 300 typically after the participant has typed one word.

When the participant stops typing, the state value will slowly decrease below the threshold.

Turning again back to FIG. 2, further embodiments of the method of the present invention will be described in the following. According to an advantageous embodiment, the method 2000 may comprise either a step 2510 of reducing the input signal from the endpoint or a step 2520 of muting a microphone 400 associated with the endpoint. The signal 340 may then preferably include information that the input signal is reduced or that the microphone is muted. In particular, the signal 340 may preferably be a warning signal.

According to an embodiment, the method 2000 may further comprise a step 2600 of identifying a segment of input signal comprising a disturbing transient noise (i.e. for which presence of transient noise has been detected). Then, the identified segment may be replaced with a silent segment or a comfort noise segment. As an alternative, the identified segment may be replaced with a segment generated on the basis of long term statistics of the input signal. Another alternative may also be to replace the identified segment with a segment generated by interpolation of features of adjacent segments of the input signal. According to yet another alternative, the identified segment may be treated for noise reduction or noise suppression.

In the following, an illustrative example of an embodiment of the invention will be described. In the example, a conference call is held. The participant's endpoints may be connected via a conference bridge using VoIP. The conference bridge may be provided with an apparatus for indicating transient noise in accordance with any of the embodiments described above with reference to the apparatus 300 shown in FIG. 3 and carrying out any of the embodiments described above with reference to the method 2000 shown in FIG. 2.

In this specific example, the activity monitoring unit 310 may carry out the following steps:
performing VAD to obtain VAD decisions every 20 ms;
updating the buffer of last 100 ms VAD decisions; and
determining if an inactive to active transition has happened within the 100 ms VAD buffer.
if yes (i.e. if an inactive to active transition has happened within the 100 ms VAD buffer), then signal activity
if no (i.e. if no inactive to active transition has happened within the 100 ms VAD buffer), then signal no activity Further, the detecting unit 320 may carry out the following step:
checking if keyboard typing has occurred in the latest 10 ms block (or checking if information about an input event provided by an operating system has been received)
if yes (i.e. if keyboard typing has occurred in the latest 10 ms block or information about an input event has been received during the latest 10 ms), then signal potential source of transient noise detected
if no (i.e. if no keyboard typing has occurred in the latest 10 ms block or if no information about an input even has been received during the latest 10 ms), then signal no potential source of transient noise detected The processor may then update the state value such that if a potential source of transient noise is detected and activity is signaled, 100 is added to the state value, otherwise 1 is subtracted from the state value.

In particular, the processor may be configured to maintain or limit the lowest value of the state value to 0.

Optionally, if the state value exceeds 300, the transmitting unit 330 may send a warning signal. The warning signal may then initiate an application layer of the IP software to mute the participant's microphone 400. Preferably, a window may pop up, announcing to the participant that muting has occurred and providing the option of unmuting.

Effects and features of the apparatus 300 and its embodiments are largely analogous to those described in connection with the method 2000. It will be appreciated that different features in embodiments described with reference to the method 2000 can be combined with the apparatus 300 and vice versa.

While specific embodiments have been described, the skilled person will understand that various modifications and alterations are conceivable within the scope as defined in the appended claims.

In particular, it is envisaged that the present invention may be implemented locally, i.e. at any endpoint of the call, such as e.g. in a computer or device used by a participant, or centrally (e.g. at the conference bridge itself).

Advantageously, implementation at a central entity is performed based on the step of analyzing the input signal since the central entity (e.g. the conference bridge) may not be able to receive information about an input event such as information indicating that a key of a keyboard has effectively been pressed at an endpoint. Local implementation of the invention at an endpoint may be performed based on the step of receiving information of presence of a potential source of transient noise by the participant's device or a combination of this step with the step of analyzing the input signal.

Further, the present invention may be applied for conference calls involving several participants, i.e. a multi-point call or conference, but also for point to point calls. Further, the mentioned time intervals and time periods described above are only examples and are not limiting the invention. For example, the buffering period of time may be comprised in the range of 50 ms to 1000 ms or any other suitable period of time. The first time interval may be comprised in the range of 1 ms to 200 ms or any other suitable time interval and the second time interval may be 1 ms to 100 ms or any other suitable time interval. Moreover, the steps in the method may be carried out in any other suitable order than described above and shown in the drawings.

The invention claimed is:

1. A method of indicating presence of transient noise in a call, said method comprising the steps of:
   determining activity at an endpoint of said call by monitoring presence of a signal input from said endpoint into said call;
   monitoring presence of a source of transient noise at said endpoint;
   buffering, for a period of time, determinations associated with the step of determining activity at said endpoint or determinations associated with the step of monitoring presence of a source of transient noise at said endpoint;
   determining that a transient noise is present in the call based on a source of transient noise being detected at said endpoint and an inactive to active transition being detected in said activity;
   updating a state value based on the determination that a transient noise is present in the call, wherein the updating includes adding a first predetermined value to a state value in response to the source of transient noise being detected at said endpoint within said buffering period of time and the inactive to active transition being detected in said activity within said buffering period of time; and
   sending a signal representative of the presence of a transient noise in said call, wherein the signal includes information about said state value.

2. The method as defined in claim 1, wherein the signal representative of the presence of a transient noise in said call includes a degree of confidence indicating a probability of transient noise being present in said call.

3. The method as defined in claim 1, wherein updating the state value includes:
   subtracting a second predetermined value from a state value in response to the source of transient noise being detected at said endpoint within said buffering period of time and the inactive to active transition being detected in said activity outside of said buffering period of time;
   subtracting a third predetermined value from a state value in response to the inactive to active transition being detected in said activity within said buffering period of time and the source of transient noise being detected at said endpoint outside of said buffering period of time; and
   subtracting a fourth predetermined value from a state value in response to the source of transient noise being detected at said endpoint outside of said buffering period of time and the inactive to active transition being detected in said activity outside of said buffering period of time.

4. The method as defined in claim 1, wherein the step of determining activity at said endpoint is performed on the basis of a time interval, said time interval being shorter than the buffering period of time.

5. The method as defined in claim 1, wherein the step of monitoring presence of a source of transient noise at said endpoint includes analyzing the input signal from said endpoint.

6. The method as defined in claim 1, wherein the step of monitoring presence of a source of transient noise at said endpoint includes receiving information indicating that a potential source of transient noise has been activated at said endpoint.

7. The method as defined in claim 6, wherein said receiving information is performed on the basis of a time interval, said time interval being shorter than said buffering period of time.

8. The method as defined in claim 2, wherein said signal representative of the presence of a transient noise in said call is a warning signal indicating presence of a disturbing transient noise in said call if the degree of confidence indicates a high probability of transient noise being present in said call.

9. The method as defined in claim 1, wherein said signal representative of the presence of a transient noise in said call is a warning signal indicating presence of a disturbing transient noise if said state value exceeds a threshold.

10. The method as defined in claim 1, further comprising:
    reducing the input signal from said endpoint,
    wherein said signal representative of the presence of a transient noise in said call includes information that the input signal is reduced.

11. The method as defined in claim 1, further comprising:
    muting a microphone associated with said endpoint,
    wherein said signal representative of the presence of a transient noise in said call includes information that the microphone is muted.

12. The method as defined in claim 1, further comprising:
    identifying a segment of input signal comprising a disturbing transient noise; and
    replacing the identified segment with a silent segment or a comfort noise segment.

13. The method as defined in claim 1, further comprising:
    identifying a segment of input signal comprising a disturbing transient noise; and
    replacing the identified segment with a segment generated based on long term statistics of the input signal.

14. The method as defined in claim 1, further comprising:
    identifying a segment of input signal comprising a disturbing transient noise; and
    replacing the identified segment with a segment generated by interpolation of features of adjacent segments of the input signal.

15. The method as defined in claim 1, further comprising:
    identifying a segment of input signal comprising a disturbing transient noise; and
    processing the identified segment through noise reduction or noise suppression.

16. An apparatus for indicating presence of transient noise in a call, said apparatus comprising:
    a processor;
    an activity monitoring unit for determining activity at an endpoint of said call by monitoring presence of a signal input from said endpoint into said call;
    a detecting unit for monitoring presence of a source of transient noise at said endpoint, and determining that a transient noise is present in the call based on a source of transient noise being detected at said endpoint by the detecting unit and an inactive to active transition being detected in said activity by the activity monitoring unit;
    a timer configured to synchronize the operations of the activity monitoring unit and the detecting unit such that determinations of the activity monitoring unit and the detecting unit are made within a predetermined time window; and a transmitting unit for sending a signal representative of the presence of a transient noise in said call, wherein said processor is configured to update a state value based on the detecting unit determining that a transient noise is present in the call, the processor updating the state value by adding a first predetermined value to the state value if the source of transient noise is detected at said endpoint by the detecting unit within said time window and the inactive to active transition is detected in said activity by the activity monitoring unit within said time window, and wherein the signal sent by the transmitting unit includes information about said state value.

17. The apparatus of claim 16, wherein the detecting unit detects a source of transient noise at said endpoint based on an analysis of an input signal detected by the activity monitoring unit or based on information received by the detecting unit indicating that a potential source of transient noise has been activated at the endpoint.

18. The apparatus of claim 16, wherein the processor is configured to:

subtract a second predetermined value from the state value if the source of transient noise is detected at said endpoint by the detecting unit within said time window and the inactive to active transition is detected in said activity by the activity monitoring unit outside of said time window;

subtract a third predetermined value from the state value if the inactive to active transition is detected in said activity by the activity monitoring unit within said time window and the source of transient noise is detected at said endpoint by the detecting unit outside of said time window; and subtract a fourth predetermined value from the state value if the source of transient noise is detected at said endpoint by the detecting unit outside of said time window and the inactive to active transition is detected in said activity by the activity monitoring unit outside of said time window.

19. The apparatus of claim 16, wherein the signal sent by the transmitting unit includes a degree of confidence indicating a probability of transient noise being present in the call.

20. The apparatus of claim 16, further comprising a buffer for storing, during said predetermined time window, the determinations made by the activity monitoring unit and the detecting unit.

21. The apparatus of claim 16, wherein the signal sent by the transmitting unit is a warning signal indicating presence of a disturbing transient noise in the call if said state value exceeds a threshold.

22. The apparatus of claim 16, wherein the processor is configured to reduce the input signal from said endpoint, and wherein the signal sent by the transmitting unit includes information indicating that the input signal is reduced.

23. The apparatus of claim 16, wherein the processor is configured to mute a microphone associated with said endpoint, and wherein the signal sent by the transmitting unit includes information indicating that the microphone is muted.

24. The apparatus of claim 16, wherein the processor is configured to:

identify a segment of input signal comprising a disturbing transient noise; and replace the identified segment with a silent segment or a comfort noise segment.

* * * * *

UNITED STATES PATENT AND TRADEMARK OFFICE
CERTIFICATE OF CORRECTION

Page 1 of 1

PATENT NO. : 8,818,799 B2
APPLICATION NO. : 13/179239
DATED : August 26, 2014
INVENTOR(S) : Enbom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 187 days.

Signed and Sealed this
Eleventh Day of August, 2015

Michelle K. Lee
*Director of the United States Patent and Trademark Office*